UNITED STATES PATENT OFFICE.

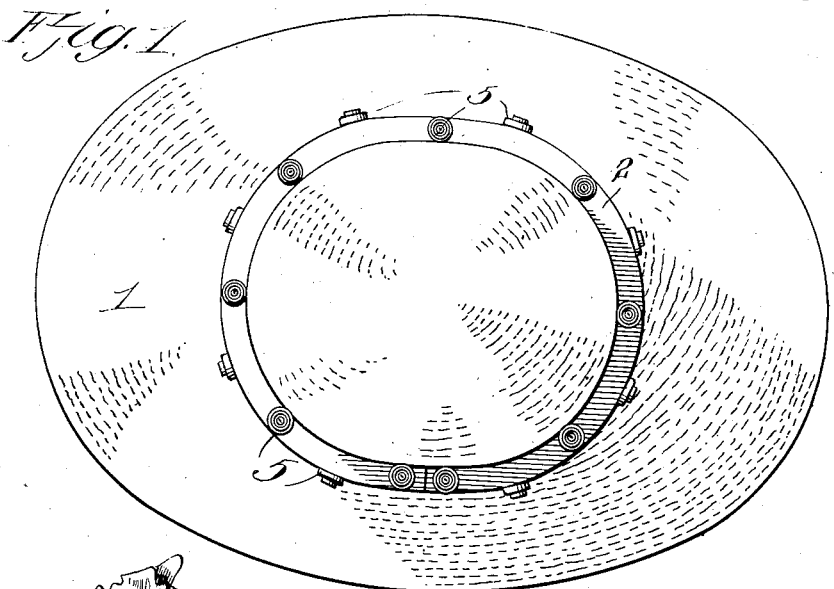
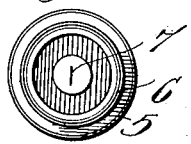 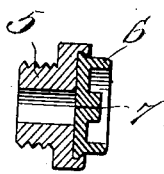

FÉLIX PASCUAL MATÉ, OF HABANA, CUBA.

HAT.

No. 930,304.     Specification of Letters Patent.     Patented Aug. 3, 1909.

Application filed July 24, 1908. Serial No. 445,209.

*To all whom it may concern:*

Be it known that I, FÉLIX PASCUAL MATÉ, a subject of the King of Spain, residing at Habana, in the Republic of Cuba, have invented new and useful Improvements in Hats, of which the following is a specification.

This invention relates to ladies' hats, and one of the principal objects of the invention is to provide means whereby natural flowers may be secured to the hat with the ends of the stems of the flowers projecting into a water reservoir.

Another object of the invention is to provide means whereby natural flowers may be kept from wilting when applied to a lady's hat.

These and other objects may be attained by means of the construction illustrated in the accompanying drawing, in which,—

Figure 1 is a plan view of a hat having applied to the crown portion thereof a flower holder made in accordance with my invention. Fig. 2 is a central vertical section of the same and showing flowers connected to the flower holder with the stems projecting into the water contained therein. Fig. 3 is a plan view of the stem holder. Fig. 4 is a vertical section of the same.

Referring to the drawing, the numeral 1 designates a lady's hat, and surrounding the crown portion of the hat is a hollow thin sheet metal water reservoir or container 2 which is secured behind the sweat band 3 of the hat by means of suitable points or prongs 4. The reservoir or container 2 is provided around its outer side and on the upper edge thereof with a series of flower holders 5 comprising a threaded plug having secured in the outer portion thereof a rubber diaphragm 6 provided with a slot 7 through which the stems of the flowers 8 may project into the water 9 in the holder 2, thus preventing the flowers from wilting. Any suitable number of the flower holders may be used, and their positions upon the water holder may be changed to permit the flowers to project in various directions.

From the foregoing it will be obvious that my invention is of simple construction, can be readily applied to any hat, and that natural flowers of any suitable kind can be attached to the flower holders and prevented from readily wilting by holding the ends of the stems in the water, and that fresh water may be placed in the water holder by withdrawing one of the plugs 5.

I claim:—

In combination with a hat, a flower holder comprising a water reservoir surrounding the crown of the hat, a series of plugs fitted into said reservoir, said plugs each having an elastic diaphragm provided with a slot or aperture through which the stems of natural flowers may project into the water of the reservoir.

In testimony whereof I affix my signature in presence of two witnesses.

FÉLIX PASCUAL MATÉ.

Witnesses:
    ALFRED B. WESTRUP,
    FELIPE GALLO ALONSO.